United States Patent Office 3,840,544
Patented Oct. 8, 1974

3,840,544
ALKYL 4-ALKOXY - 7 - (PYRIDYL)-3-QUINOLINE-CARBOXYLATES, THEIR PREPARATION AND CONVERSION TO CORRESPONDING 4 - OXO COMPOUNDS
Roman R. Lorenz, East Greenbush, and R. Pauline Brundage, Schodack, N.Y., assignors to Sterling Drug Inc., New York, N.Y.
No Drawing. Filed June 19, 1972, Ser. No. 263,787
Int. Cl. C07d 33/48
U.S. Cl. 260—287 R                3 Claims

ABSTRACT OF THE DISCLOSURE

Lower-alkyl 4 - Q-7-(Q'-4-pyridyl)-3-quinolinecarboxylate (I) where Q is halo or lower-alkoxy, and Q' is hydrogen or from one to two lower-alkyl groups, is prepared by reacting lower-alkyl 1,4 - dihydro - 4-oxo-7-(Q'-4-pyridyl)-3-quinolinecarboxylate (II) with a halogenating agent to produce said compound (Ia) where Q is halo and then reacting the resulting 4-halo compound with alkali metal lower-alkoxide to produce said compound (Ib) where Q is lower-alkoxy. The lower-alkyl 4-(lower-alkoxy) - 7-(Q'-4-pyridyl)-3-quinolinecarboxylate (Ib) is hydrolyzed under acidic conditions to produce lower-alkyl 1,4 - dihydro - 4-oxo-7-(Q'-4-pyridyl)-3-quinolinecarboxylate (II), which is useful as an intermediate in the preparation of lower-alkyl 1-(lower-alkyl)-1,4-dihydro-4-oxo-7-(Q'-4-pyridyl)-3-quinolinecarboxylate and -3-quinolinecarboxylic acid, anti-bacterial agents.

This invention relates to lower-alkyl 4-substituted-7-(4-pyridyl) - 3-quinolinecarboxylates and to processes for their preparation and utilization as intermediates.

The invention in its composition aspect resides in the compounds of Formula I

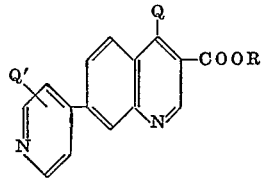

where Q is halo or lower-alkoxy, R is lower-alkyl, and Q' is hydrogen or from one to two lower-alkyl groups. These compounds are useful as intermediates in the preparation of the corresponding lower-alkyl 1-(lower-alkyl)-1,4-dihydro-4-oxo-7-(Q'-4-pyridyl)-3-quinolinecarboxylates and -3-quinolinecarboxylic acids, which are useful as antibacterial agents and which are disclosed and claimed in the copending Lesher and Carabateas U.S. patent application Ser. No. 144,307, filed May 17, 1971, now U.S. Pat. 3,753,993, issued Aug. 21, 1973. Preferred embodiments of the invention because of their relative ease of preparation from readily available and low costing intermediates are the compounds of Formula I where Q' is hydrogen, methyl or ethyl, Q is methoxy or ethoxy, and R is methyl or ethyl.

The invention in a process aspect resides in the process of reacting lower-alkyl 4-oxo-7-(Q'-4-pyridyl)-3-quinolinecarboxylate of the Formula II

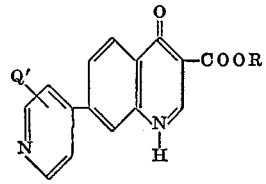

where R and Q' are defined as hereinabove with a halogenating agent to produce the compounds of Formula I where Q is halo.

The invention in another process aspect resides in the process of reacting the compound of Formula I where Q is halo and R is lower-alkyl with alkali metal lower-alkoxide, preferably using lower-alkanol as solvent, to produce the compound of Formula I where Q is lower-alkoxy. These 4-(lower-alkoxy) compounds also were isolated as byproducts in yields of about 10 to 35% in the reaction of lower-alkyl 1,4 - dihydro-4-oxo-7-(Q'-4-pyridyl)-3-quinolinecarboxylate of Formula II with an alkylating agent to produce the corresponding lower-alkyl 1-(lower-alkyl)-1,4-dihydro-4-oxo-7-(Q'-4-pyridyl)-3-quinolinecarboxylate.

The invention in another process aspect resides in hydrolyzing under acidic conditions the 4-(lower-alkoxy) compound of Formula I where Q is lower-alkoxy to produce said lower-alkyl 1,4-dihydro-4-oxo-7-(Q'-4-pyridyl)-3-quinolinecarboxylate of Formula II, which, as noted above, on 1 - alkylation yields the antibacterially active lower-alkyl 1 - (lower-alkyl)-1,4-dihydro-4-oxo-7-(Q'-4-pyridyl)-3-quinolinecarboxylates.

The processes of the invention are illustrated by the following flow sheet:

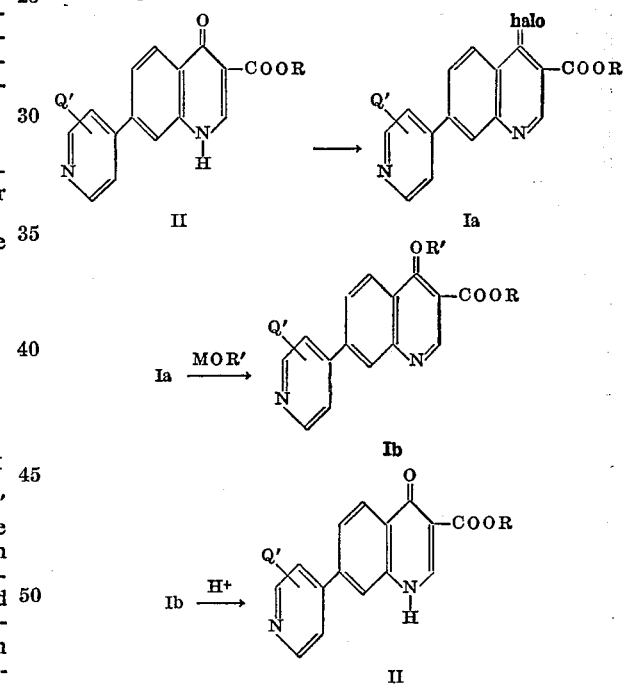

where R and R' are each lower-alkyl and can be the same or different, Q' is hydrogen or from one to two lower-alkyl groups, and M is alkali metal. When the reaction of Ia with MOR' is carried out using as solvent lower-alkanol, R"OH where R" is lower-alkyl, the results are as follows:

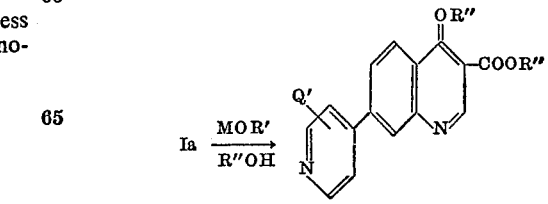

where R' and R" can be the same or different. Thus, MOR' first reacts with R"OH to produce MOR" which reacts with the 4-halo compound and the ester exchange reaction between R″OH and the 3-COOR compound to produce the 3-COOR″ compound also takes place.

The term "lower-alkyl," as used herein, means alkyl groups having from one to six carbon atoms, illustrated by methyl, ethyl, n-propyl, isopropyl, 2-butyl, isobutyl, n-amyl, n-hexyl, and the like, preferred groups because of their ready availabality from low costing compounds being methyl and ethyl.

The term "halo," as used herein, means chloro or bromo, with chloro being preferred because of the ready availability and cost advantages of chloro intermediates.

The term "lower-alkoxy," as used herein, means alkoxy groups having from one to six carbon atoms, illustrated by methoxy, ethoxy, n-propoxy, isopropoxy, n-butoxy, 2-butoxy, isobutoxy, n-amoxy, n-hexoxy, and the like.

The intermediate compounds illustrated by Formula II, exist in tautomeric forms, that is, as the 1,4-dihydro-3-(COOR)-4-oxo-7-PY quinolines of Formula II and/or the 3-(COOR)-4-hydroxy-7-PY-quinolines of Formula II', illustrated as follows:

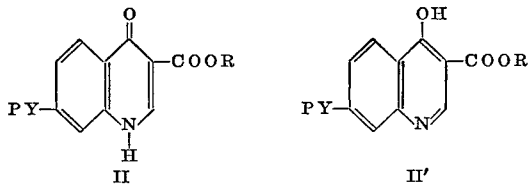

where R is lower-alkyl and PY is Q'-4-pyridyl wherein Q' is hydrogen or from one to two lower-alkyl groups. Measurements of the infrared spectra, in potassium bromide admixture, or in chloroform solution or mineral oil suspension, indicate existence predominantly as structure II and we have preferred to use the names based on structure II, although it is understood that either or both structures are comprehended.

The intermediate compounds of Formula II and/or II' are disclosed and claimed in said copending application Ser. No. 144,307.

The molecular structures of the composition aspects of the invention were established by their mode of synthesis and confirmed by the correspondence of calculated and found values for the elementary analyses and molecular weight determinations using the mass spectrograph for representative examples and by infrared, ultraviolet and NMR spectral analyses.

The manner and process of making and using the instant invention will now be generally described so as to enable a person skilled in the art of chemistry to make and use the same as follows.

The reaction which comprises reacting lower-alkyl 1,4-dihydro - 4 - oxo-7-(Q'-4-pyridyl)-3-quinolinecarboxylate (II) with halogenating agent to produce the corresponding lower-alkyl 4-halo-7-(Q'-4-pyridyl)-3-quinolinecarboxylate (I, Q is halo) is carried out by heating the reactants together in the absence or presence of a suitable solvent at about 40 to 150° C., preferably from about 80 to 120° C. The reaction is conveniently run by heating only the reactants with stirring on a steam bath. While the preferred halogenating agent is phosphorus oxychloride, other halogenating agents can be used, e.g., phosphorus oxybromide, phosphorus trichloride, phosphorus pentachloride, thionyl chloride, phenyl phosphonic dichloride, phosgene, and the like. Suitable solvents, if desired, include chloroform, benzene, toluene, xylene, chlorobenzene, methylene dichloride, and the like.

The reaction which comprises reacting lower-alkyl 4-halo-7-(Q'-4-pyridyl) - 3 - quinolinecarboxylate (I, Q is halo) with alkali metal lower-alkoxide is carried out preferably at about room temperature (about 25 °C.) or up to about 80° C. and preferably using lower-alkanol as solvent. Alternatively, lower temperatures, as low as about 0° C., can be used although the completion of reaction might take longer. At least one molar equivalent quantity of the alkali metal lower-alkoxide is used per mole of lower-alkyl 4-halo-7-(Q'-4-pyridyl)-3-quinolinecarboxylate. Said alkali metal lower-alkoxide can be generated by any of several well known procedures, such as the reaction of an alkali metal or of any alkali organometallic, e.g., phenyllithium, or of an alkali metal lower-alkoxide with a different lower-alkanol. While this reaction is run preferably with lower-alkanol as the solvent, it also can be carried out using a solvent inert under the reaction conditions, e.g., acetonitrile, dimethylformamide, tetrahydrofuran, ether, chloroform, benzene, toluene, and the like.

The reaction which comprises hydrolyzing under acidic conditions lower-alkyl 4-(lower-alkoxy)-7-(Q'-4-pyridyl)-3-quinolinecarboxylate (I, Q is lower-alkoxy) to produce lower-alkyl 1,4 - dihydro-7-(Q'-4-pyridyl)-3-quinolinecarboxylate (II) is conveniently carried out by heating on a steam bath in an aqueous acidic medium lower-alkyl 4-(lower-alkoxy)-7-(Q'-4-pyridyl) - 3 - quinolinecarboxylate. While aqueous nitric acid is preferred in practicing our invention because of its ready availability and low cost and because a more granular, easier filterable solid product is obtained, other aqueous acidic media include other aqueous mineral acids, e.g., aqueous hydrochloric, hydrobromic or sulfuric acid or the like.

The best mode contemplated for carrying out the invention is now set forth as follows:

EXAMPLE 1

Ethyl 4-chloro-7-(4-pyridyl)-3-quinolinecarboxylate.— A mixture containing 10 g. of ethyl 1,4-dihydro-4-oxo-7-(4-pyridyl)-3-quinolinecarboxylate and 100 ml. of phosphorus oxychloride was heated with stirring on a steam bath under anhydrous conditions for forty minutes. The resulting solid-liquid reaction mixture was allowed to cool to room temperature and the solid collected. The solid was dissolved in 400 ml. of water. The aqueous solution was neutralized with ammonium hydroxide whereupon a solid precipitated. The solid was extracted from the aqueous mixture with chloroform. The chloroform extract was dried over anhydrous potassium carbonate and evaporated in vacuo to remove the chloroform. The residue was recrystallized from 100 ml. of ethanol to yield 5.90 g. of ethyl 4-chloro-7-(4-pyridyl)-3-quinolinecarboxylate, m.p. 133–136° C.

Following the procedure described in Example 1 but using a molar equivalent quantity of phosphorus oxybromide in place of phosphorus oxychloride, the product obtained is ethyl 4 - bromo-7-(4-pyridyl)-3-quinolinecarboxylate.

Ethyl 4-chloro - 7 - (4-pyridyl)-3-quinolinecarboxylate also is obtained following the procedure described in Example 1 but using in place of phosphorus oxychloride a molar equivalent quantity of phosphorus trichloride, phosphorus pentachloride, thionyl chloride, phenylphosphonic dichloride or phosgene as the chlorinating agent.

EXAMPLE 2

Ethyl 4-ethoxy-7-(4-pyridyl)-3-quinolinecarboxylate.— An 8.4 g. portion of ethyl 4-chloro-7-(4-pyridyl)-3-quinolinecarboxylate was dissolved in 400 ml. of ethanol at about 35° C. and to this solution was added with stirring 4.5 g. of sodium methoxide. Sodium chloride was observed to precipitate at once. The mixture was stirred at room temperature (about 25° C.) for ten minutes, refluxed for ten minutes, cooled to room temperature and then neutralized with acetic acid. The resulting mixture was concentrated in vacuo at about 50° C. The residue was triturated with chloroform, the insoluble materials removed by filtration and the filtrate concentrated in vacuo at about 50° C. To the residual oily material was added 50 ml. of ether whereupon a solid precipitated. The solid was filtered off and the filtrate was evaporated to a volume of about 100 ml. and allowed to cool. The resulting crystalline precipitate was collected and dried to yield 3.8 g.

of ethyl 4 - ethoxy-7-(4-pyridyl)-3-quinolinecarboxylate, m.p. 100° C. (immersed in 100° C. bath).

Following the procedure described in Example 2 but using methanol in place of ethanol, there is obtained methyl 4-methoxy-7-(4-pyridyl)-3-quinolinecarboxylate.

Following the procedure described in Example 2 but using in place of ethyl 4-chloro-7-(4-pyridyl)-3-quinolinecarboxylate and sodium methoxide respective molar equivalent quantities of ethyl 4 - bromo-7-(4-pyridyl)-3-quinolinecarboxylate and potassium ethoxide, there is obtained ethyl 4 - ethoxy-7-(4-pyridyl)-3-quinolinecarboxylate.

The following compounds are prepared by reacting ethyl 4 - chloro-7-(4-pyridyl)-3-quinolinecarboxylate with the appropriate sodium, potassium or lithium lower-alkoxide using dimethylformamide as solvent, a reaction temperature of about 35–50° C., removal of the solvent *in vacuo* at about 50° C., triturating the residue with chloroform as in Example 2, removal of the chloroform *in vacuo*, and treatment of the residue with ether as in Example 2 to yield a solid product: Ethyl 4-n-propoxy-7-(4-pyridyl)-3-quinolinecarboxylate using lithium n- propoxide, ethyl 4 - isopropoxy-7-(4-pyridyl)-3-quinolinecarboxylate using potassium isopropoxide, ethyl 4-n-butoxy-7 - (4 - pyridyl)-3-quinolinecarboxylate using sodium n-butoxide, ethyl 4-isobutoxy-7-(4-pyridyl)-3-quinolinecarboxylate using potassium isobutoxide, ethyl 4-n-amoxy-7-(4-pyridyl) - 3 - quinolinecarboxylate using sodium n-amoxide or ethyl 4-n-hexoxy-7-4-pyridyl)-3-quinolinecarboxylate using sodium n-hexoxide.

Ethyl 4 - ethoxy-7-(4-pyridyl)-3-quinolinecarboxylate also was isolated in yields of up to about 18% in the 1-ethylation of ethyl 1,4 - dihydro-4-oxo-7-(4-pyridyl)-3-quinolinecarboxylate, for example, by its reaction with diethyl sulfate, illustrated as follows: A mixture containing 140 g. of ethyl 1,4 - dihydro-4-oxo-7-(4-pyridyl)-3-quinolinecarboxylate and 1500 ml. of dimethylformamide was heated to 60° C. and to it was added 246 g. of anhydrous powdered potassium carbonate. To this stirred mixture kept at about 65 to 68° C. was added dropwise over a period of about seventy-five minutes 84 g. of diethyl sulfate. The reaction mixture was heated with stirring for an additional one hour at the same temperature and then concentrated *in vacuo*. The residue was treated with water, the mixture stirred for about fifteen minutes and then filtered. The solid was washed with water and recrystallized from 700 ml. of isopropyl alcohol using decolorizing charcoal and dried at 70° C. to yield 90 g. of product; the isopropyl alcohol filtrate (a) containing the 4-ethoxy compound was saved and worked up as described hereinbelow. The 1-ethylated final product was dissolved in chloroform; the chloroform solution was washed twice with water, dried over anhydrous potassium carbonate, treated with decolorizing charcoal, filtered and the chloroform removed *in vacuo*; the residue was crystallized from isopropyl alcohol, washed with isopropyl alcohol and n-pentane, and dried to yield 80 g. of ethyl 1-ethyl-1,4-dihydro-4-oxo-7-(4 - pyridyl)-3-quinolinecarboxylate, m.p. 164–170° C.; the isopropyl alcohol filtrate (d) was saved.

The filtrate (a) was concentrated *in vacuo* to remove the chloroform. The residue was dissolved in chloroform; water was added; and, the mixture was filtered. The layers were separated. The chloroform layer was washed twice with water, dried over anhydrous potassium carbonate, treated with decolorizing charcoal and filtered. The filtrate was concentrated *in vacuo* to remove the chloroform. The residue was recrystallized from 120 ml. of isopropyl alcohol to yield 17 g. of solid, which was combined with 8 g. of solid obtained by removing the solvent from the filtrate (d). A 19 g. portion of this combined solid was recrystallized from 300 ml. of isopropyl acetate to yield another 4.7 g. of the 1-ethyl product. The isopropyl acetate filtrate was cooled in an ice bath for a few minutes. The resulting crystalline precipitate was collected and recrystallized from a small amount of isopropyl acetate using decolorizing charcoal to yield 5.0 g. of ethyl 4-ethoxy-7-(4-pyridyl)-3-quinolinecarboxylate, m.p. 99–100° C. The structure of this compound was confirmed by its NMR and IR spectra.

EXAMPLE 3

Ethyl 1,4 - dihydro-4-oxo-7-(4 - pyridyl)-3-quinolinecarboxylate.—To a stirred suspension containing 270 g. of ethyl 4 - ethoxy-7-(4-pyridyl)-3-quinolinecarboxylate and eight liters of warm water heated on a steam bath was added steamwise over a period of fifteen minutes a solution containing 79 ml. of 90% nitric acid in 200 ml. of water. The initially formed nitrate salt was colloidal and stirring was rather slow. As the ethyl ether was hydrolyzed, the precipitate became more granular and after about ninety minutes a nicely powdered solid was formed. The resulting light green product was filtered; was washed successively with three 50 ml. portions of 5% nitric acid, three 150 ml. portions of isopropyl alcohol and three 50 ml. portions of ether; and then dried at 60° C. *in vacuo* to yield 270 g. of ethyl 1,4-dihydro-4-oxo-7-(4-pyridyl)-3-quinolinecarboxylate as its nitrate salt, m.p. >290° C. A solution containing 400 g. of ammonium chloride in four liters of water was heated on a steam bath to 90° C. and 200 g. of ethyl 1,4-dihydro-4-oxo-7-(4-pyridyl)-3-quinolinecarboxylate nitrate was added in one portion. The suspension was stirred vigorously and 100 ml. of ammonium hydroxide was added dropwise over a period of fifteeen minutes. A yellow mushy precipitate resulted and the mixture was stirred for an additional fifty minutes whereupon the precipitate became more granular. The precipitate was collected and washed successively with three 50 ml. portions of 3% ammonium hydroxide and three 50 ml. portions of isopropyl alcohol. The product was then slurried in 400 ml. of acetone and the slurry filtered. The product was washed with four 200 ml. portions of ether and dried at 60° C. *in vacuo* overnight (about fifteen hours) to yield 225 g. of ethyl 1,4-dihydro-4-oxo-7-(4-pyridyl)-3-quinolinecarboxylate, m.p. 290° C. with decomposition.

A 17 g. sample of ethyl 1,4 - dihydro - 4 - oxo-7-(4-pyridyl)-3-quinolinecarboxylate nitrate was hydrolyzed with dilute sodium hydroxide solution at reflux to give after acidifying with acetic acid 12 g. of 1,4-dihydro-4-oxo - 7 - (4 - pyridyl)-3-quinolinecarboxylic acid, m.p. >300° C.

Following the procedure described in Example 3 but using in place of ethyl 4-ethoxy-7-(4-pyridyl)-3-quinolinecarboxylate a molar equivalent quantity of methyl 4-methoxy-7-(4-pyridyl)-3-quinolinecarboxylate, ethyl 4-n-propoxy - 7 - (4-pyridyl)-3-quinolinecarboxylate, ethyl 4-isopropoxy-7-(4-pyridyl)-3-quinolinecarboxylate, ethyl 4-n-butoxy-7-(4 - pyridyl)-3-quinolinecarboxylate, ethyl 4-isobutoxy-7 - (4-pyridyl)-3-quinolinecarboxylate, ethyl 4-n-amoxy-7-(4-pyridyl)-3-quinolinecarboxylate or ethyl 4-n-hexoxy-7-(4 - pyridyl)-3-quinolinecarboxylate, there is obtained methyl 1,4 - dihydro - 4 - oxo-7-(4 - pyridyl)-3-quinolinecarboxylate from the methyl 4-methoxy compound and there is obtained ethyl 1,4-dihydro-4-oxo-7-(4-pyridyl)-3-quinolinecarboxylate from each of the remaining ethyl 4-(lower-alkoxy) compounds.

EXAMPLE 4

Ethyl 4-chloro-7-(2,6-dimethyl-4-pyridyl)-3-quinolinecarboxylate is prepared following the procedure described in Example 1 using a molar equivalent quantity of ethyl 1,4 - dihydro-7-(2,6-dimethyl-4-pyridyl)-4-oxo-3 - quinolinecarboxylate in place of ethyl 1,4-dihydro-7-(4-pyridyl)-4-oxo-3-quinolinecarboxylate.

EXAMPLE 5

Ethyl 4-ethoxy-7-(2,6-dimethyl-4-pyridyl)-3-quinolinecarboxylate, m.p. 146–148° C., is prepared following the procedure described in Example 2 using ethyl 4-chloro-7-(2,6 - dimethyl-4-pyridyl)-3-quinolinecarboxylate, sodium methoxide and ethanol as the solvent.

Ethyl 4-ethoxy-7-(2,6-dimethyl-4-pyridyl)-3-quinolinecarboxylate also was isolated as a by-product in yields of up to about 35% in the 1-ethylation of ethyl 1,4-dihydro-7 - (2,6 - dimethyl-4-pyridyl)-4-oxo-3-quinolinecarboxylate, for example, using diethyl sulfate as the ethylating agent, illustrated as follows: To 6.3 liters of dry dimethylformamide was added with stirring 425 g. of ethyl 1,4-dihydro - 7 - (2,6-dimethyl-4-pyridyl)-4-oxo-3-quinolinecarboxylate and 309 g. of anhydrous potassium carbonate. After 500 ml. of dimethylformamide had been distilled off *in vacuo* to ensure anhydrous reaction conditions, the reaction mixture was heated on a steam bath for about forty minutes, cooled to 70° C. and then treated dropwise over a period of about forty minutes, with stirring, with a solution containing 271 g. of diethyl sulfate in 100 ml. of dry dimethylformamide, keeping the reaction temperature between 70–75° C. After the addition had been completed, the reaction mixture was heated to 95° C. and held there for one hour, cooled to 30° C. and filtered. The filtrate was concentrated *in vacuo* to dryness. The solid was refluxed with six liters of n-heptane and filtered while hot, washing the solid with 1500 ml. of hot n-heptane. The combined n-heptane filtrate and washings which contained the 4-ethoxy by-product were saved and worked up as described hereinbelow. The solid final product, i.e., the 1-ethylated compound, was dissolved in six liters of hot chloroform; the hot solution treated with decolorizing charcoal and filtered; and the filtrate concentrated *in vacuo* to remove the chloroform. The solid residue was recrystallized from ten liters of boiling isopropyl acetate using decolorizing charcoal and dried *in vacuo* at 60° C. to yield 260 g. of ethyl 1-ethyl-1,4-dihydro-7-(2,6-dimethyl - 4 - pyridyl)-4-oxo-3-quinolinecarboxylate, m.p. 168–170° C. Another 36 g. of the final product, m.p. 166–168° C., was obtained by concentrating the mother liquor to one liter and collecting the precipitate.

The above-noted combined n-heptane filtrate and washings containing the o-ethylated compound was concentrated *in vacuo* to remove the n-heptane, thereby yielding 144 g. of ethyl 4-ethoxy-7-(2,6-dimethyl - 4 - pyridyl)-3-quinolinecarboxylate, m.p. 146–148° C.

EXAMPLE 6

Ethyl 1,4 - dihydro-7-(2,6-dimethyl-4-pyridyl)-4-oxo-3-quinolinecarboxylate.—To a stirred suspension containing 192 g. of ethyl 4-ethoxy-7-(2,6-dimethyl-4-pyridyl)-3-quinolinecarboxylate and six liters of water heated on a steam bath was added 52 ml. of 90% nitric acid. The reaction mixture was heated with stirring at 90% C. for ninety minutes, cooled to 40° C. and the precipitate collected. This precipitate of ethyl 1,4-dihydro-7-(2,6-dimethyl-4-pyridyl)-4-oxo-3-quinolinecarboxylate as its nitrate salt was slurried in water and excess ammonium hydroxide was added to liberate the free base form of said compound. The precipitate was collected, washed with water, slurried with two liters of acetone for about three hours and filtered, and then dried *in vacuo* at 60° C. to yield 92 g. of ethyl 1,4-dihydro-7-(2,6-dimethyl-4-pyridyl)-4-oxo-3-quinolinecarboxylate, m.p. 205° C. with decomposition.

EXAMPLE 7

Ethyl 4 - chloro-7-(2-methyl-4-pyridyl)-3-quinolinecarboxylate is prepared following the procedure described in Example 1 using in place of ethyl 1,4-dihydro-4-oxo-7-(4-pyridyl)-3-quinolinecarboxylate a molar equivalent quantity of ethyl 1,4-dihydro-7-(2-methyl-4-pyridyl)-4-oxo-3-quinolinecarboxylate.

EXAMPLE 8

Ethyl 4-ethoxy-7-(2-methyl-4-pyridyl)-3-quinolinecarboxylate is prepared following the procedure described in Example 2 using in place of ethyl 4-chloro-7-(4-pyridyl)-3-quinolinecarboxylate a molar equivalent quantity of ethyl 4 - chloro - 7 - (2 - methyl - 4 - pyridyl) - 3-quinolinecarboxylate.

EXAMPLE 9

Ethyl 1,4-dihydro-7-(2-methyl-4-pyridyl)-4-oxo-3-quinolinecarboxylate is prepared following the procedure described in Example 3 but using in place of ethyl 4-ethoxy-7-(4-pyridyl)-3-quinolinecarboxylate a molar equivalent quantity of ethyl 4-ethoxy-7-(2-methyl-4-pyridyl)-3-quinolinecarboxylate.

EXAMPLE 10

Ethyl 4-chloro-7-(2,5-dimethyl-4-pyridyl)-3-quinolinecarboxylate is prepared following the procedure described in Example 1 using in place of ethyl 1,4-dihydro-4-oxo-7-(4-pyridyl)-3-quinolinecarboxylate a molar equivalent quantity of 1,4-dihydro-7-(2,5-dimethyl-4-pyridyl)-4-oxo-3-quinolinecarboxylate.

EXAMPLE 11

Ethyl 4-ethoxy-7-(2,5-dimethyl-4-pyridyl)-3-quinolinecarboxylate is prepared following the procedure described in Example 2 using in place of ethyl 4 - chloro - 7 - (4-pyridyl)-3-quinolinecarboxylate a molar equivalent quantity of ethyl 4 - chloro - 7 - (2,5 - dimethyl - 4 - pyridyl)-3-quinolinecarboxylate.

EXAMPLE 12

Ethyl 1,4-dihydro-7-(2,5-dimethyl-4-pyridyl)-4-oxo-3-quinolinecarboxylate is prepared following the procedure described in Example 3 but using in place of ethyl 4-ethoxy-7-(4-pyridyl) - 3 - quinolinecarboxylate a molar equivalent quantity of ethyl 4-ethoxy-7-(2,5-dimethyl-4-pyridyl)-3-quinolinecarboxylate.

EXAMPLE 13

Ethyl 4-chloro-7-(2,3-dimethyl-4-pyridyl)-3-quinolinecarboxylate is prepared following the procedure described in Example 1 using in place of ethyl 1,4-dihydro-4-oxo-7-(4-pyridyl)-3 - quinolinecarboxylate a molar equivalent quantity of ethyl 1,4-dihydro-7-(2,3-dimethyl-4-pyridyl)-4-oxo-3-quinolinecarboxylate.

EXAMPLE 14

Ethyl 4-ethoxy-7-(2,3-dimethyl-4-pyridyl)-3-quinolinecarboxylate is prepared following the procedure described in Example 2 using in place of ethyl 4 - chloro - 7 - (4-pyriyl)-3-quinolinecarboxylate a molar equivalent quantity of ethyl 4-chloro-7-(2,3-dimethyl-4-pyridyl)-3-quinolinecarboxylate.

EXAMPLE 15

Ethyl 1,4-dihydro-7-(2,3-dimethyl-4-pyridyl)-4-oxo-3-quinolinecarboxylate is prepared following the procedure described in Example 3 but using in place of ethyl 4-ethoxy-7 - (4-pyridyl)-3-quinolinecarboxylate a molar equivalent quantity of ethyl 4-ethoxy-7-(2,3-dimethyl-4-pyridyl)-3-quinolinecarboxylate.

EXAMPLE 16

Ethyl 4-chloro-7-(2,6-diethyl-4-pyridyl)-3-quinolinecarboxylate is obtained following the procedure described in Example 1 but using in place of ethyl 1,4-dihydro-4-oxo-7-(4-pyridyl) - 3 - quinolinecarboxylate a corresponding molar equivalent quantity of ethyl 7 - (2,6 - diethyl - 4-pyridyl)-1,4-dihydro-4-oxo-3-quinolinecarboxylate.

EXAMPLE 17

Ethyl 4-ethoxy-7-(2,6-diethyl-4-pyridyl)-3-quinolinecarboxylate is obtained following the procedure described in Example 2 but using in place of ethyl 4-chloro-7-(4-pyridyl)-3-quinolinecarboxylate a molar equivalent quantity of ethyl 4-chloro-7-(2,6-diethyl-4-pyridyl)-3-quinolinecarboxylate.

EXAMPLE 18

Ethyl 7 - (2,6-diethyl-4-pyridyl)-1,4-dihydro-4-oxo-3-quinolinecarboxylate is obtained following the procedure described in Example 3 using in place of ethyl 4-ethoxy-7-

(4-pyridyl)-3 - quinolinecarboxylate a molar equivalent quantity of ethyl 4 - ethoxy-7-(2,6-diethyl-4-pyridyl)-3-quinolinecarboxylate.

We claim:
1. A compound of the formula

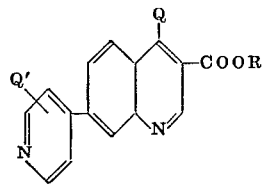

where Q is lower-alkoxy, R is non-tertiary lower-alkyl, and Q' is hydrogen or from one to two non-tertiary lower-alkyl groups, where lower in each of lower-alkyl and lower-alkoxy designates from one to six carbon atoms.

2. Ethyl 4-ethoxy-7-(4-pyridyl)-3-quinolinecarboxylate according to claim 1.
3. Ethyl 4-ethoxy-7-(2,6-dimethyl-4-pyridyl)-3-quinolinecarboxylate according to claim 1.

References Cited
UNITED STATES PATENTS

| | | | |
|---|---|---|---|
| 3,397,208 | 8/1968 | Berman | 260—287 R |
| 3,414,576 | 12/1968 | Cairns | 260—287 R |
| 3,472,859 | 10/1969 | Lesher | 260—287 R |
| 3,485,845 | 12/1969 | Davis | 260—287 R |
| 3,563,981 | 2/1971 | Lesher | 260—287 R |
| 3,665,005 | 5/1972 | Harris | 260—287 R |
| 3,506,667 | 4/1970 | Kaminsry | 260—287 R |
| 3,753,993 | 8/1973 | Lesher et al. | 260—287 |

FOREIGN PATENTS

| | | | |
|---|---|---|---|
| 1,207,771 | 10/1970 | Great Britain | 260—287 R |

DONALD G. DAUS, Primary Examiner

UNITED STATES PATENT AND TRADEMARK OFFICE
CERTIFICATE OF CORRECTION

PATENT NO. : 3,840,544
DATED : October 8, 1974
INVENTOR(S) : Roman R. Lorenz and Ruth Pauline Brundage It is certified that error appears in the above-identified patent and that said Letters Patent are hereby corrected as shown below:

Column 2, lines 26 thru 34, formula Ia, should read

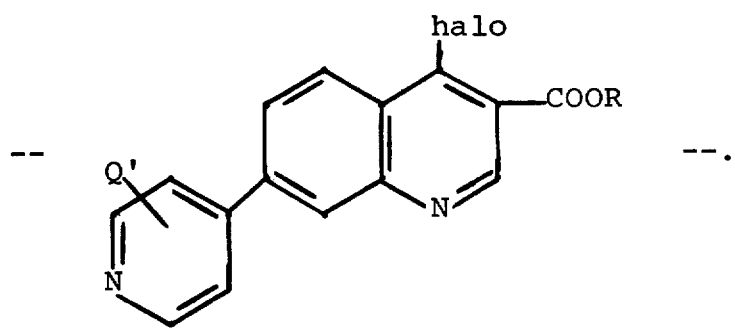

Ia

Column 2, lines 36 thru 44, formula Ib should read

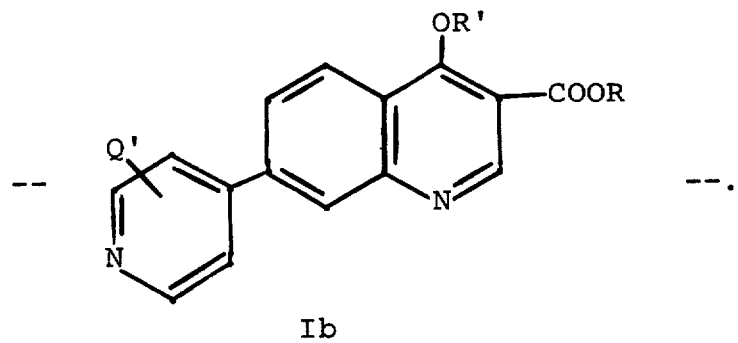

Ib

UNITED STATES PATENT AND TRADEMARK OFFICE
CERTIFICATE OF CORRECTION

PATENT NO. : 3,840,544
DATED : October 8, 1974
INVENTOR(S) : Roman R. Lorenz and Ruth Pauline Brundage It is certified that error appears in the above-identified patent and that said Letters Patent are hereby corrected as shown below:

Column 2, lines 61 thru 68, the formula of the product should read

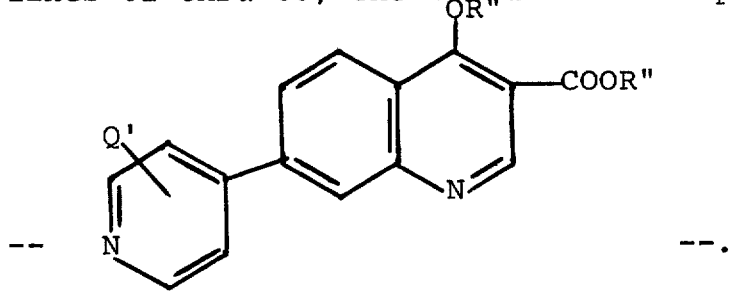

--                                                                     --.

Column 3, line 6, "availabality" should read
-- availability --.

Signed and Sealed this

Twenty-first Day of September 1976

[SEAL]

Attest:

RUTH C. MASON
*Attesting Officer*

C. MARSHALL DANN
*Commissioner of Patents and Trademarks*